US008984047B2

(12) United States Patent  (10) Patent No.: US 8,984,047 B2
Gassewitz et al.  (45) Date of Patent: Mar. 17, 2015

(54) TARGETED CONTENT DELIVERY MECHANISM BASED ON NETWORK APPLICATION DATA

(75) Inventors: Michael Gassewitz, Ottawa (CA); Denny Lung Sun Lee, Ottawa (CA); Robert Gaudet, Ottawa (CA)

(73) Assignee: Alcatel Lucent, Boulogne-Billancourt (FR)

( * ) Notice: Subject to any disclaimer, the term of this patent is extended or adjusted under 35 U.S.C. 154(b) by 796 days.

(21) Appl. No.: 12/694,114

(22) Filed: Jan. 26, 2010

(65) Prior Publication Data

US 2010/0191692 A1    Jul. 29, 2010

Related U.S. Application Data

(60) Provisional application No. 61/147,446, filed on Jan. 26, 2009.

(51) Int. Cl.
*G06F 15/16* (2006.01)
*H04L 29/08* (2006.01)
*G06Q 30/00* (2012.01)
*H04H 60/33* (2008.01)

(52) U.S. Cl.
CPC .............. *H04L 67/22* (2013.01); *H04L 67/306* (2013.01); *H04L 67/02* (2013.01)
USPC ............... 709/203; 709/249; 705/7.29; 725/9

(58) Field of Classification Search
CPC .............. G06Q 30/02; G06Q 30/0201; G06Q 30/0202; H04N 21/2668; H04H 60/46
USPC ........................ 709/203, 249; 705/7.29; 725/9
See application file for complete search history.

(56) References Cited

U.S. PATENT DOCUMENTS

| 7,729,940 | B2 * | 6/2010 | Harvey et al. | 705/7.31 |
|---|---|---|---|---|
| 2006/0212900 | A1 * | 9/2006 | Ismail et al. | 725/34 |
| 2007/0021200 | A1 * | 1/2007 | Fox et al. | 463/30 |
| 2007/0061487 | A1 * | 3/2007 | Moore et al. | 709/246 |
| 2007/0067297 | A1 * | 3/2007 | Kublickis | 707/9 |
| 2008/0133360 | A1 * | 6/2008 | Ullah | 705/14 |
| 2008/0133361 | A1 * | 6/2008 | Ullah | 705/14 |
| 2008/0133362 | A1 * | 6/2008 | Ullah | 705/14 |
| 2008/0133363 | A1 * | 6/2008 | Ullah | 705/14 |
| 2008/0133364 | A1 * | 6/2008 | Ullah | 705/14 |
| 2008/0201731 | A1 * | 8/2008 | Howcroft | 725/13 |
| 2008/0220760 | A1 * | 9/2008 | Ullah | 455/420 |
| 2011/0153429 | A1 * | 6/2011 | Ullah | 705/14.64 |

* cited by examiner

*Primary Examiner* — David Lazaro
*Assistant Examiner* — Vitali Korobov
(74) *Attorney, Agent, or Firm* — Wolff & Samson PC

(57) ABSTRACT

A system and method are provided for delivering targeted content to a subscriber coupled to a service provider network. Network application data generated by the subscriber is received and processed by a network application element deployed in the service provider network associated with a network identifier of the subscriber's computing device. The network application data is generated from user interaction with a server coupled to the service provider network or through a public communication network. The network application data is converted to web events associated with the network identifier. The web events are filtered to remove irrelevant data from received web events. A subscriber profile can then be generated base upon the filtered web events associated with the subscriber. Targeted content can then be delivered to the subscriber based upon the subscriber's profile.

22 Claims, 9 Drawing Sheets

TARGETED CONTENT DELIVERY MECHANISM BASED ON NETWORK APPLICATION DATA

CROSS-REFERENCE TO RELATED APPLICATIONS

This application claims priority, under 35 U.S.C. §119(e), to U.S. Provisional Patent Application Ser. No. 61/147,446, filed on Jan. 26, 2009. U.S. Provisional Patent Application Ser. No. 61/147,446 is hereby incorporated by reference in its entirety.

TECHNICAL FIELD

The present disclosure relates to the field of targeted content delivery. In particular, to an apparatus and a method for targeted content delivery mechanism based on network application data.

BACKGROUND OF INVENTION

The performance (i.e. efficacy) of targeted content delivery to a user in an on-line web based environment is typically measured by its relevancy to the audience. Content in this context can, for example, be an advertisement or a piece of media such as a video, a music file, etc., delivered to a computing device for presentation to a user or subscriber. The performance can typically be optimized by having an increasing amount of information related to an audience's historical consumption of content (e.g. websites visits, searches), near-term web activities (e.g. search, eCommerce transactions, etc.), as well as by observing and comparing to other similar audiences' behaviors.

In the existing art, network application elements (i.e. systems that deliver applications and/or services that are located within, or interwork with, a communication provider's network) and targeted content delivery systems are typical implemented as standalone solutions thus missing the opportunities to leverage the strengths offered by each solution and the synergy of coupling these solutions to increase both targeting relevancy performance and financial uplift performance.

What is needed is a solution that addresses the targeting performance optimization problem by leveraging the rich sources of data that reside within the network application elements. Accordingly, a method and system that enable targeted content delivery based on network application data generated by a subscriber remain highly desirable.

SUMMARY OF INVENTION

In accordance with one aspect of the present disclosure there is provided a system for delivering targeted content to a subscriber of the system. The system comprising: a service provider network coupling the subscriber's computing device one or more communication networks; a network application element deployed in the service provider network for processing network application data associated with a network identifier of the subscriber's computing device, the network application data generated from user interaction with a server coupled to the service provider network or through a public communication network; a data preparation element deployed in the service provider network for receiving the network application data from the network application element and generating web events associated with the network identifier based on the network application data, the web events conforming to a common data scheme; a profiler coupled to the service provider network for maintaining a profile of the subscriber generated from the web events associated with the subscriber, the profile characterizing the subscriber's interests inferred from a type of the network application data monitored by the network application element; and a content server in communication with the profiler for selecting and delivering targeted content to the subscriber based upon the subscriber's profile.

In accordance with another aspect of the present disclosure there is provided A computer implemented method of delivering targeted content to a subscriber coupled to a service provider network. The method comprising: receiving and processing subscriber network application data generated from a subscriber's computing device coupled to the service provider network; generating web events, by data preparation and event generation element, the web events based upon the received subscriber network application data; updating a subscriber profile using one or more profiling algorithms and the web events; providing web content to a web server, in response to a content request based upon the subscriber profile.

BRIEF DESCRIPTION OF DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Embodiments are described below, by way of example only, with reference to FIGS. 1-9.

Figure 1:
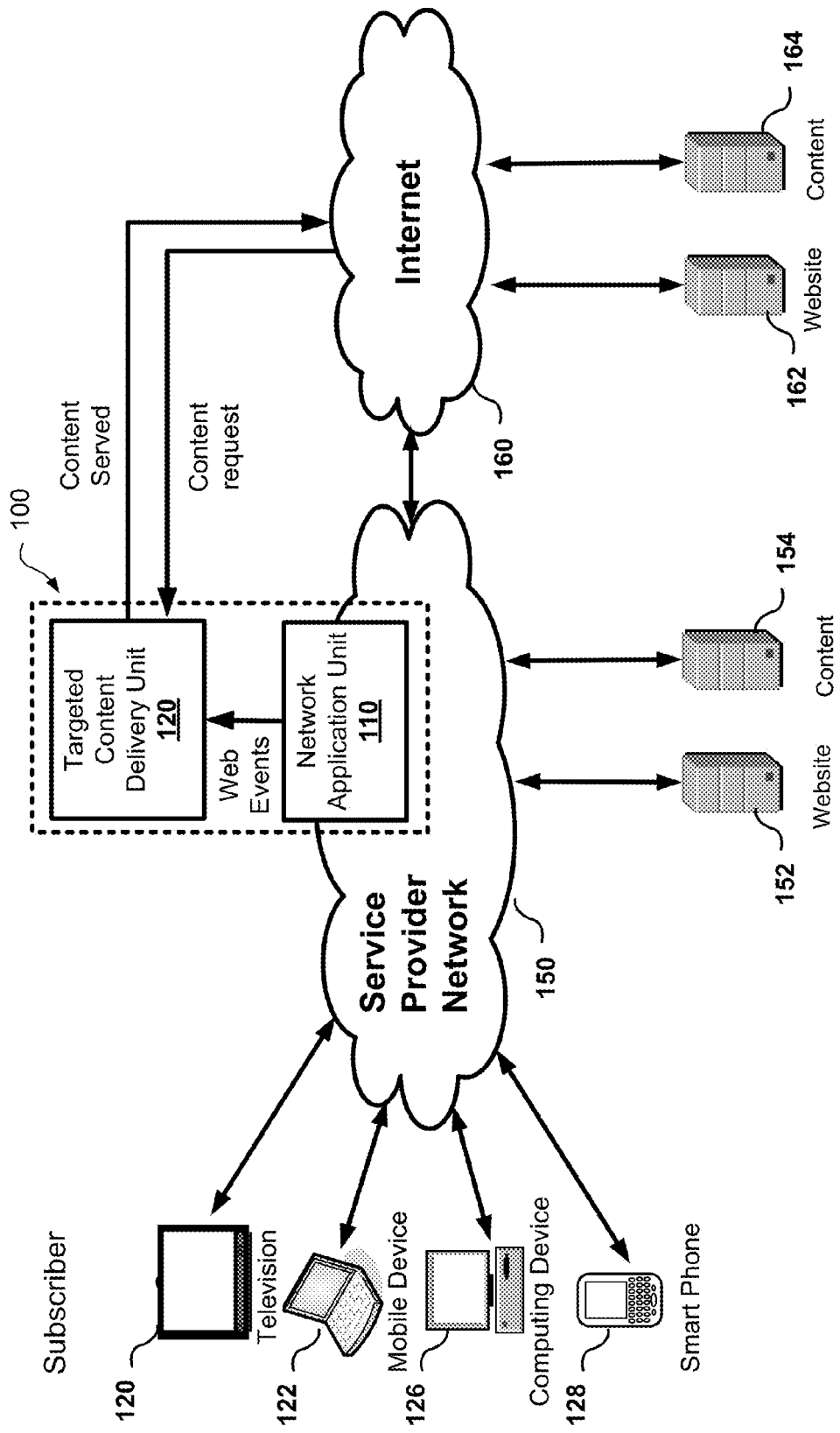
FIG. 1 is a schematic representation of a system for targeted content delivery mechanism based on network application data.

FIG. 1 is a schematic representation of a system 100 for targeted content delivery mechanism based on network application data. The system 100 comprises a network application unit 110 and a targeted content delivery unit 120. The service provider may be any provider such as an Internet service provider (ISP) or network carrier, such as a wireless network carrier, providing a network 150 to enable subscribers to use computing device to access network based services. The subscribers uses networked computing devices such as Internet Protocol television 120, mobile devices such as laptops, notebooks or netbooks 122, desktop computing devices 126 or wireless communications devices such as smartphones 128 to access content provided by web services coupled to the network. The service provide network 150 may provide direct access to web services provided from within the network, such as websites 152 or other content sources 154, or to services coupled to the Internet 160 (or other public communication network), such as website 162 or content sources 164. The network application unit 110 receives network application data such as subscriber traffic from subscribers 120, 122, 126 and 128 transiting network 150 and generates web events based upon the received traffic. The targeted content delivery unit 120 processes the web events and utilizes the data to generate user profiles and provide targeted content to the user.

Network-based application in this context can be any service offered by a service provider that involves transporting, monitoring, processing, delivering, or controlling of a subscriber's communication information. Examples of network-based applications (i.e. services) include: broadband Internet access and connectivity, online security monitoring, online security protection, website rating and reporting, content caching, Quality-of-Service (QoS) monitoring and enhancement, and other similar services. The network application unit 110, itself, can be an endpoint of the communication; or alternatively it can be part of the network 150 that connects the subscriber(s) 120-128 with other communication endpoints (e.g. online security monitoring between the subscriber(s) 120-128 and a website).

Figure 2:
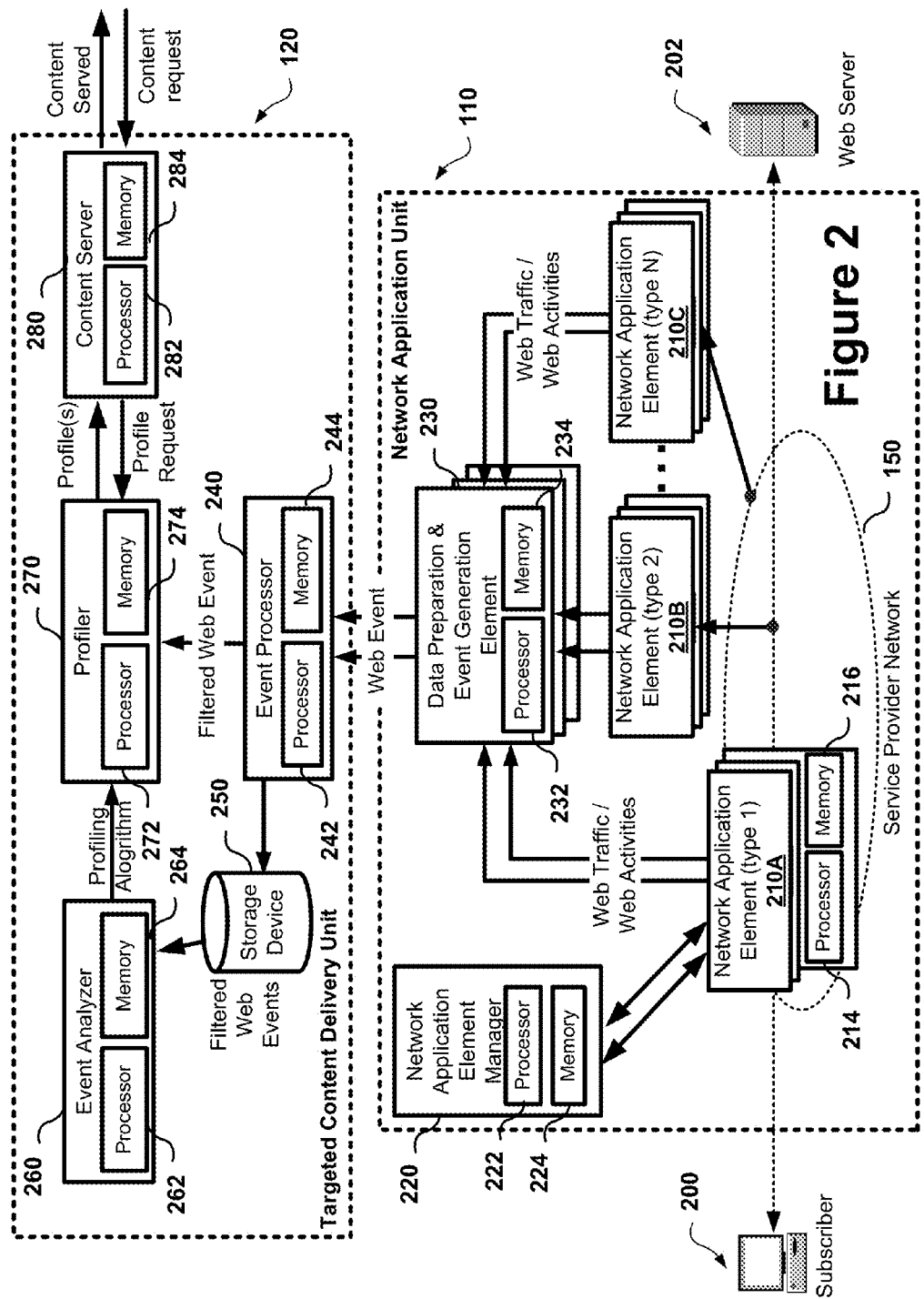
FIG. 2 is a detailed schematic representation of a system for targeted content delivery mechanism based on network application data.

As shown in FIG. 2, subscriber 200, which can be a subscriber such as 120-128, accesses content from web server 202 through service provider network 150. The server 202 may be may be directly connected to network 150, such as servers 152 and 154, or may be coupled to an external network 160 such as servers 162 and 164 which may be connected via a network such as the Internet. The network application unit 110 comprises a plurality of network application elements 210A-C each comprise at least a processor 214, memory 216 and a network interface (not shown), one or more data preparation and event generation elements 230 comprising at least a processor 232, memory 234 and a network interface (not shown), and a network application element manager 220 comprising at least a processor 222, memory 224 and a network interface (not shown). The targeted content delivery unit 120 comprises an event processor 240 comprising at least a processor 242, memory 244 and a network interface (not shown), and an event analyzer 260 comprising at least a processor 262, memory 264 and a network interface (not shown), a storage device 250 for storing filtered web events, a profiler 270 comprising at least a processor 262, memory 264 and a network interface (not shown) and a content server 280 comprising at least a processor 282, memory 284 and a network interface (not shown). These individual elements are described in more detail below. Although the network application unit 110 and the targeted content delivery unit 120 are described as comprising individual elements and/or units each being executed by individual processors and memory, the functionality of the network application unit 110 and the targeted content delivery unit may each be consolidated and executed on a single processor or computing platform depending on network topology.

Network Application Unit

Each network application unit 110 enables a network application for the subscriber 120-128. The network application element 210 supports capturing or logging of network application data, web traffic or web activities, between the subscriber 200 and the web server 202. The term 'web' in this document refers to the accessing network accessible data comprising content such as text, images, videos, and other multimedia using hyperlinks. The network application element 210 also supports exporting or allows external access of these web traffic activities. Web traffic is typically hypertext transfer protocol (HTTP)-based traffic that uses transmission control part (TCP) port 80. Web activities are summarized web traffic that can, for example, include: website visit, video download, e-Commerce interaction on website, search performed, and other similar Internet activities. A network application unit 110 can comprise one or more types of network application elements 210. Each type of network application element 210 performs and offers one network application to a subscriber base. In an exemplary embodiment, the system 100 can comprise a plurality of network application elements 210 of the same type in order to offer the same service to the entire subscriber base (i.e. for scalability reasons). Note again that the network application element 210 itself can be an endpoint that the subscriber communicates with—as depicted in FIG. 2 as network application element 210C of type N (e.g. in the case of content caching service). Alternatively, the network application element 210 can be part of the communication data path, but not as a communication endpoint—as depicted in FIG. 2 as network application element 210A of type 1 (e.g. in the simple case of internet connectivity, a router or switch can be considered as a type of network application element). Furthermore, the network application element 210 need not participate in the communication data path—as depicted in FIG. 2 as network application element 210B of type 2 (e.g. in case of an application that requires only offline monitoring functionality).

Each data preparation and event generation element 230 provides for interfacing with one or more of network application elements 210 (of various types) and is responsible for accessing the network application data such as web traffic or web activities that are alternatively forwarded or logged by the network application elements 210. After receiving the web traffic or web activities, the data preparation and event generation element 210 is responsible for eliminating unnecessary data (e.g. removing the content portion of HTTP web traffic, removing the content portion of a web based video stream, etc.) and ultimately formulating the web traffic/activities into well-defined web events for down stream processing. Examples of web events are search events, website visit events, advertisement (ad) click events, e-Commerce interaction events, online video selection events, and other similar events. These events, accompanied by a subscriber identifier (ID) such as, for example, an Internet Protocol (IP) address associated with the subscriber 120-128, are sent to targeted content delivery unit 120 for processing.

The network application element manager 330 provides for the management of a network application element 210 including, for example, configuration, fault monitoring, and performance management functions. Additionally the network application element manager 220 can also serve as an information collection point in which information related to the usage of the network application by individual subscribers 120-128 can be gathered. This information can be used for analysis of the service performance (e.g. content consumption in a content caching application) or can be analyzed, summarized and reported back to each individual subscriber 120-128 (e.g. in a web rating or online security reporting service offering).

Targeted Content Delivery Unit

The event processor 240 provides for collecting and aggregating events from the data preparation and event generation elements 230. The network application data such as web events are further filtered (e.g. by eliminating any personal or sensitive information). The filtered web events are forwarded to the profiler 270 for further processing. The filtered web events can also be anonymized (i.e. disassociated with individual subscribers) and stored in a repository provide by a storage device or memory 250. When web events are anonymized, the subscriber ID associated with each event can, for example, be replaced by a non-reversible alias so that events can still be grouped by origin while ensuring personal anonymity. The anonymous stored web events are then periodically transported or made available to the event analyzer 260 for processing.

The profiler 270 is a real-time component within the targeted content delivery unit 120. The profiler 270 takes each filtered web event from the event processor 240 as input and updates one or more profiles using the one or more profiling algorithms received from the event analyzer 260. The profile can be related to, for example, the subscriber's household interests (i.e. the aggregate of all web activity associated with a single subscriber ID), personality interests within the subscriber household (i.e. one or more sub-sets of web activities associated with a single subscriber ID but attributed to one of a plurality of personalities), a content provider, or a publisher as related to the input event. The profiler 270 operates in real-time and the generated profiles are made available to the content server 280.

The event analyzer 260 provides, as a main function, to take filtered, aggregated and stored web events from the event processor 240, and performs behavior pattern recognition analysis, and generates one or more profile modelling algorithms. This process is non-real-time and can be automated or manually triggered. Each profile modelling algorithm comprises a set of rules that take web events as input and generate profile scores as output. The profile score reflects the interests of the entity (e.g. personality or household) being profiled. Each profile score can be associated with one of a plurality of categories of interest or descriptors (i.e. keywords) of interest. The generated profile modelling algorithms are then downloaded into the profiler 270. The profiler 270 can use one or more profile modelling algorithms concurrently.

The content server 280, upon receiving a request for targeted content (e.g. an advertisement, a video clip, a music file, etc.) from a content user, queries the profiler 270 for profile information related to the content user; and/or profile information related to the context of the request (e.g. this might include the context of the content provider, publisher, genre of the requested content, etc.). The content server 280 can request, from the profiler 270, profile information generated using one or more profile modelling algorithms. Based on the received profile information, the most appropriate piece of content is selected and served to the content user. The selection criteria can be based on relevancy to the user, revenue-generating ability, or other business rules related to the content user or the targeted content. The content server 280 can choose to use profile information generated using different profile modelling algorithms on successive targeted content requests in order to conduct A/B testing (i.e. alternative comparison) to optimize performance on an ongoing basis, Note that the content user can be the service provider's subscriber(s) 120-128 or another audience or consumer of the content.

The event analyzer 260 utilizes rules-based (e.g. business rules) inferential logic to generate the profiling algorithm utilized by the profiler 270. Simply stated, rules-based systems are programmed by defining 'what' is to be accomplished as contrasted to procedural logic systems that capture 'how' something is to be accomplished. Rules-based systems use rules to capture pairings of premise (i.e. predicate) and action. The rules-based system typically comprises a plurality of rules know as a rule set. The rules-based system processes each of the rules in the rule set and for each premise that is met (e.g. is found to be true) the corresponding action is taken.

Figure 3:
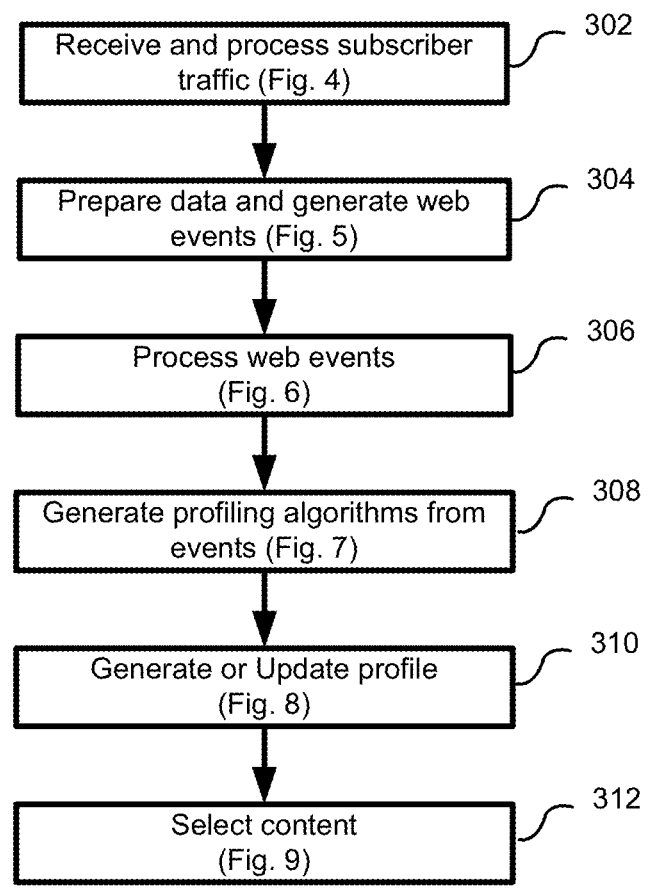
FIG. 3 is a flowchart representing a method for targeted content delivery based on network application data.

FIG. 3 is a flowchart showing a method for targeted content delivery mechanism based on network application data. The method according to the present disclosure can be implemented using the system 100 described above with reference to FIG. 2. Alternatively, the method according to the present disclosure can be implemented using computer executable program instructions stored on a computer-readable storage memory executed by one or more processors. Subscriber data traffic is received at, and processed by network application element(s) 210 at 302, as further described in connection with FIG. 4. The subscriber data traffic is prepared by aggregating events and preparing associated web events at 304 by data preparation and event generation element 230, as further described in connection with FIG. 5. Event processor 240 then processes the web events at 306 to remove or filter any personal or sensitive information and to anonymize the web event to remove potential subscriber identification information, as further described in connection with FIG. 6. Profiling algorithms can then be generated by event analyzer 260 at 308, as further described in connection with FIG. 7, by event analyzer 260 using the filtered web events to characterize subscriber preferences based upon web browsing or viewing history. A subscriber profile can then be updated or created using one or more profiling algorithms at 310, as further described in connection with FIG. 8. When a content request is received by the content server 280, appropriate content can then be selected at 312, as further described in connection with FIG. 9, and provided to the requesting web service. FIGS. 4 to 9 describe additional aspects for targeted content delivery based on network application data. Each of the described methods can be implemented in an individual processor or grouped with one more methods to be executed in a processor and memory unit.

Figure 4:
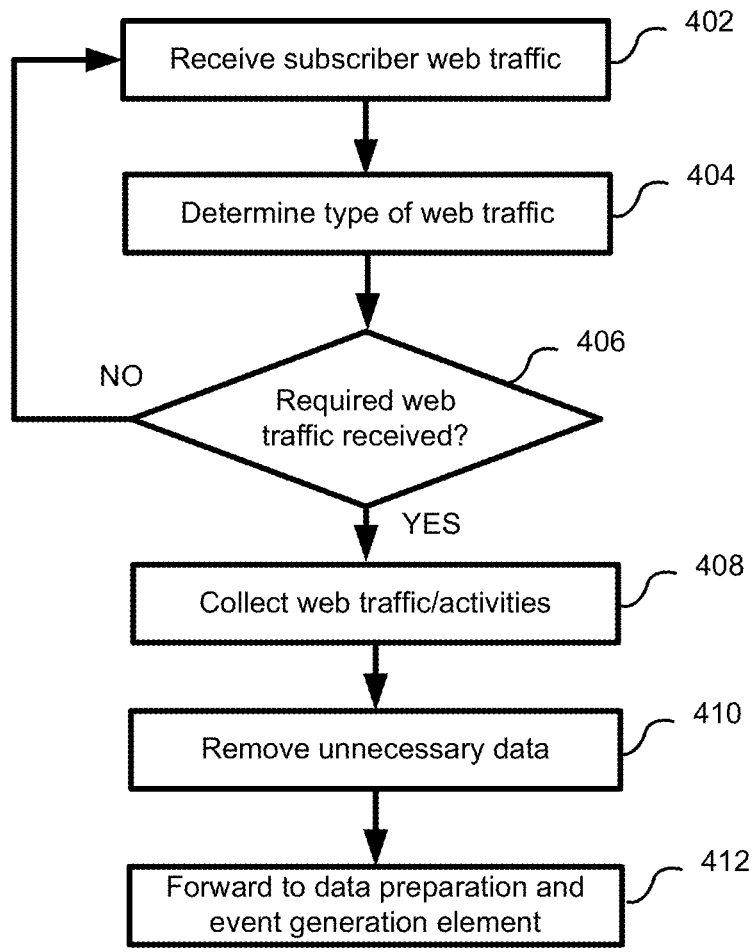
FIG. 4 is a flowchart representing a method for providing targeted content delivery in a network application element.

As shown in FIG. 4, the network application element 210 receives subscriber traffic generated by web traffic and activities at 402 between the subscriber computing devices and web server or content provider. As previously noted, based upon the type of network application element, the network application element 210 itself can be an endpoint that the subscriber communicates with, can be part of the communication data path between the subscriber and the web server, but not as a communication endpoint, or can indirectly receive subscriber traffic in an offline function and need not participate in the communication data path. The web traffic and activities are generated by user actions such as web browsing or content requests from website and content servers connected to the network. The type of the received web traffic is then determined at 404. If the subscriber web traffic does not contain relevant data, NO at 406, additional traffic is received at 402 for analysis. For example, if the received traffic does not contain relevant HTTP header and is related to other traffic types not processed by the system, the traffic will be discarded. If the received subscriber web traffic does contain the relevant data, YES at 406, sufficient packets are collected to enable re-construct the required headers at 408 to generate web events. Unnecessary payload data can then be removed from the traffic 410. The collected traffic/web activities are then forwarded for further processing to the data preparation and event generation element 230. The network application elements 210 can be managed by the network application element manager 220 which can also collect service usage information.

Figure 5:
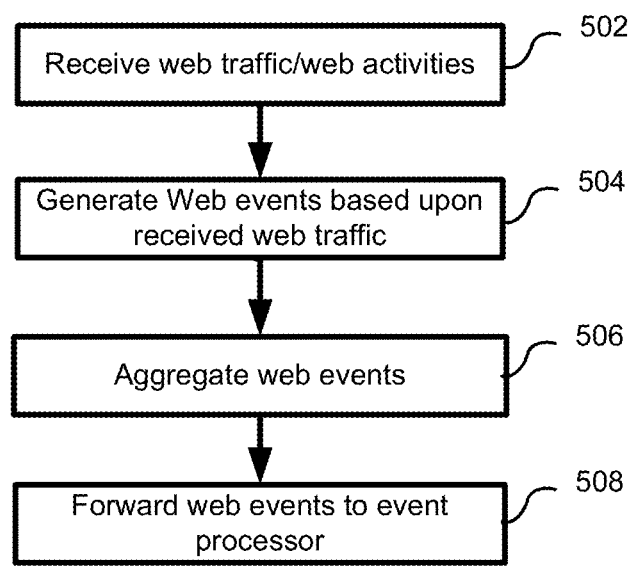
FIG. 5 is a flowchart representing a method for providing targeted content delivery in a data preparation and event generation element.

As shown in FIG. 5, the data preparation and event generation element 230, receives at 502, the web traffic and web activities from each of the network application elements 210. Based upon the type of network application element 210 and the location within the service provider network, subscriber traffic may be required from more than one network application element. Web events based upon a defined event schema are then generated at 504 Events can then be aggregated at 506 for a particular subscriber identifier and forwarded to the event processor 240. The web events are then forwarded at 508 to the targeted content delivery unit 110 for processing by the event processor 240.

Figure 6:
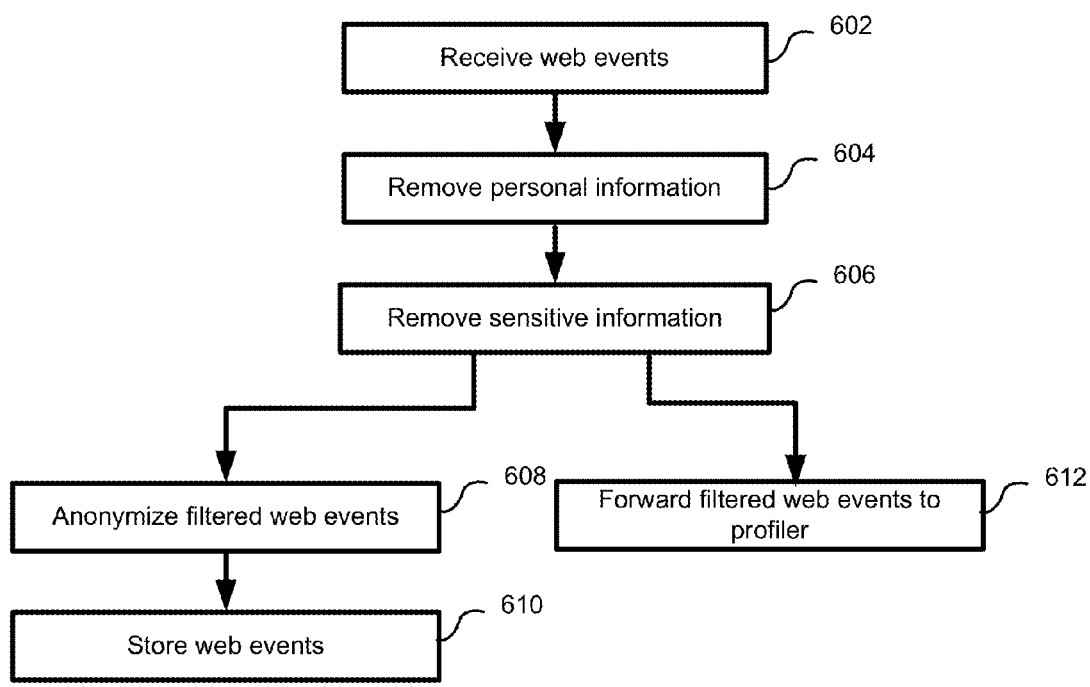
FIG. 6 is a flowchart representing a method for providing targeted content delivery in an event processor.

As shown in FIG. 6, the web events are received at 602 at the event processor 240. The event processor 240 removes or filters information contained in the web events that is not relevant to the profiling and content selection processes. Non-relevant information is filtered, such as for example duplicated data such as a rapid webpage refresh which causes noise in the collected data is filtered. A rapid webpage refresh should be recognized as one pageview event but it is collected as many frequent and identical web. In addition, personal identifying information (PII) such as names, personal or financial information that may lead to identification of the subscriber's identity is removed at 604. Sensitive information, such as content related to religious, explicit material is also removed from the Web events at 606. The Web events can be then anonymized to remove subscriber identification information at 608 and stored at 610 in a storage device 250 for using in generating profiling algorithms. In addition, after sensitive information is removed from the web events at 606, the filtered web events can be sent to the profiler at 612, including the subscriber identifier, for use by the profiler 270 to generate a subscriber profile.

Figure 7:
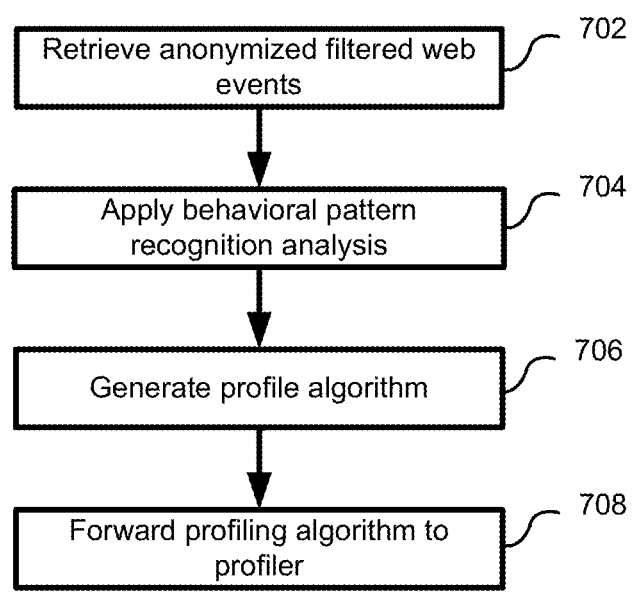
FIG. 7 is a flowchart representing a method for generating a profiling algorithm in an event analyzer.

As shown in FIG. 7, the event analyzer 260 retrieves anonymized filtered user events from storage device 250 at 702. The retrieved events are processed by application of behavioural pattern recognition analysis at 704 to determine browsing patterns provided in the web event data and determine possible preferences in terms of user content. One or more profile modelling algorithms can then be generated at 706 for use by the profiler 270. The generated algorithms are then forwarded at 708 to the profiler 270. The generation of the profile algorithms by the event analyzer 260 can occur as an off-line process and does not have to be processed in real-time.

Figure 8:
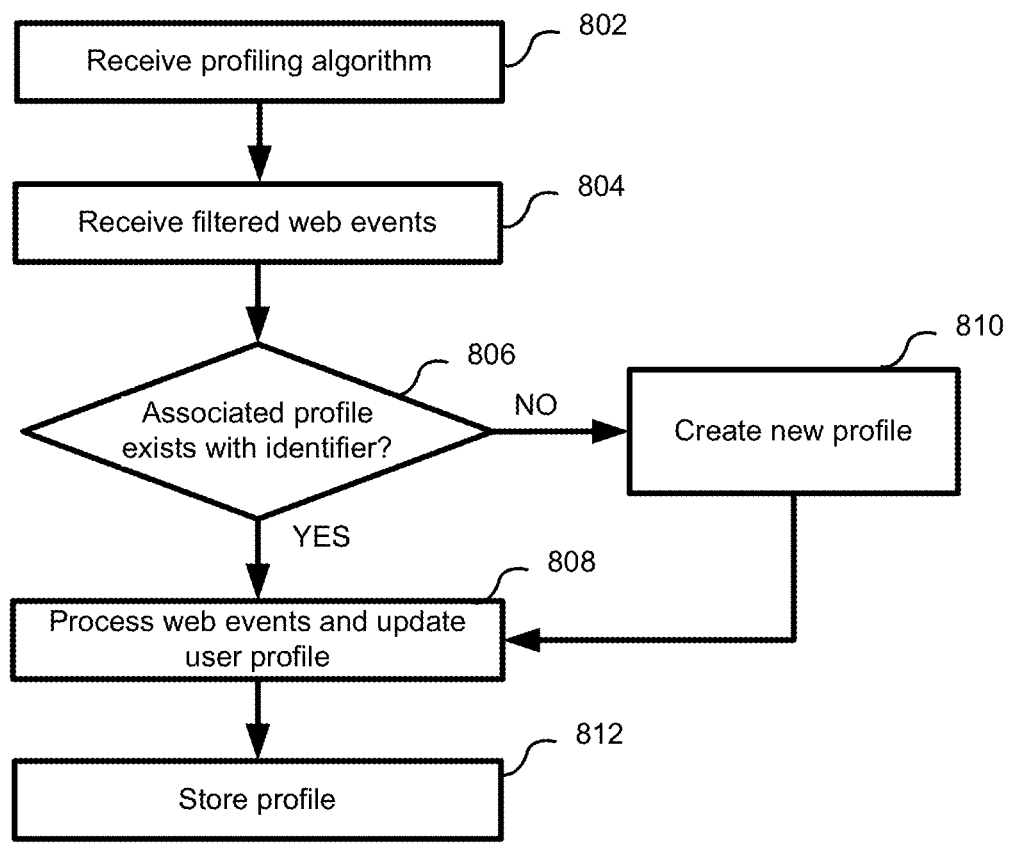
FIG. 8 is a flowchart representing a method for providing targeted content delivery in a profiler unit.

As shown in FIG. 8, the profiler 270 receives at 802 the profiling algorithms from the event analyzer 260. The filtered web events are received from the event processor 240 at 304. If a profile is already associated with the subscriber identifier, YES at 806, the received filtered web events are processed and updated based upon the user events at 808 using the profiling algorithms determined by the event analyzer 260. The profile is then stored at 812. If no associated profile exists, NO at 804, a new profile is created and the received filtered web events are processed and updated based upon the user events at 808 using the profiling algorithms determined by the event analyzer 260. The new profile is then stored at 812.

Figure 9:
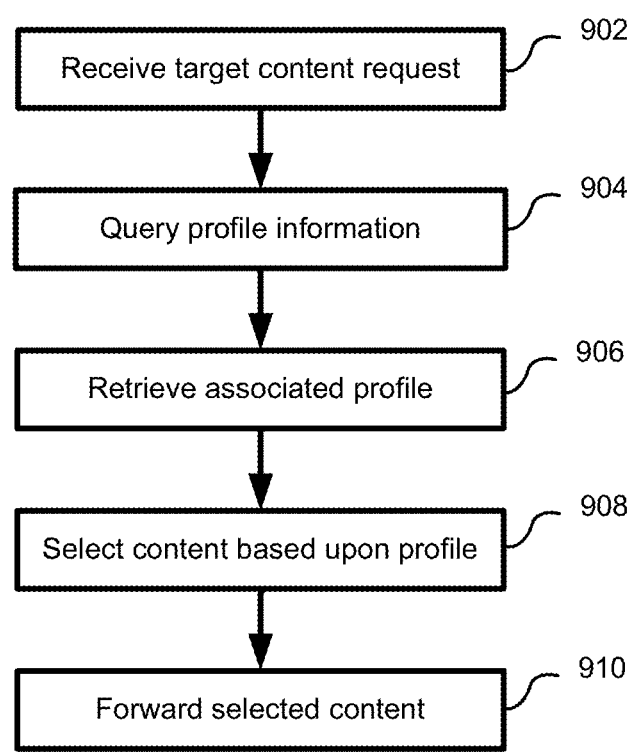
FIG. 9 is a flowchart representing a method for providing targeted content delivery in a content server.

As shown in FIG. 9, the content server 280 of the targeted content delivery unit 120, receives a targeted content request at 902 from a server coupled to the service provider network, the Internet or other communication network. The content request is associated with a subscriber identifier, such as an IP address. A query is performed to determine if an appropriate profile exists for the subscriber at 904. If a profile exists, it is retrieved at 906. A content item is then selected at 908 based on the subscriber profile information defining potential subscriber content preferences. The content item is then provided to the originator of request received at 910.

It will be apparent to one skilled in the art that numerous modifications and departures from the specific embodiments described herein may be made without departing from the spirit and scope of the present disclosure.

What is claimed is:

1. A system for delivering targeted content to a subscriber, the system comprising:
    a data preparation element deployed in a service provider network for generating web events associated with a network identifier based on network application data, the web events conforming to a common data scheme;
    an event analyzer for generating one or more profiling algorithms by applying behavior pattern recognition analysis to the web events;
    a profiler for maintaining a profile of the subscriber generated by using the one or more profiling algorithms on web events associated with the subscriber, the profile characterizing the subscriber's interests; and
    a content server for selecting and delivering targeted content to the subscriber based upon the profile of the subscriber.

2. The system of claim 1 where in the network application data is hypertext transfer protocol (HTTP)-based traffic and the web event is an HTTP header.

3. The system of claim 1 further comprising an event processing unit for receiving the generated web events and filtering irrelevant data from received web events.

4. The system of claim 3 wherein the event processing unit further comprises filtering the web events to remove data with personal and/or sensitive information (PSI).

5. The system of claim 4 wherein the event processing unit further anonymizes the filtered web events to disassociate the web event from the network identifier and stores the event in a storage device.

6. The system of claim 1 wherein the one or more profiling algorithms apply behavior pattern recognition analysis to subscriber browsing and the associated content defined in the web events.

7. The system of claim 6 wherein the one or more profiling algorithms are generated in non-real-time, and each of the one or more profiling algorithms comprise a set of rules that take web events as input and generate profile scores as output, the profile score reflect interests of an entity being profiled, and each profile score can be associated with one of a plurality of categories of interest or descriptors of interest.

8. The system of claim 7 wherein the user profile identifies the entity being profiled identifying a subscriber's household interests defining the aggregate of all web activity associated with a single subscriber ID or personality interests within the subscriber household defining one or more sub-sets of web activities associated with a single subscriber ID but attributed to one of a plurality of personalities.

9. The system of claim 1 wherein the network application element is configured within the service provider network based upon the type of application provided where the network application element application is selected from the group comprising: an endpoint that the subscriber communicates with; part of the communication data path; or can indirectly receive network application data in an offline function and need not participate in the communication data path.

10. The system of claim 1 further comprising a network application element manager for providing management of a network application elements including, configuration, fault monitoring, and performance management functions.

11. The system of claim 1 wherein the web events are selected from the group comprising: search events, website visit events, advertisement (ad) click events, e-Commerce interaction events, and online video selection events.

12. A computer implemented method of delivering targeted content to a subscriber, the method comprising:
    generating web events based upon subscriber network application data;
    generating one or more profiling algorithms by applying behavior pattern recognition analysis to the web events;
    updating a subscriber profile by using the one or more profiling algorithms on the web events; and
    providing web content to a web server, in response to a content request, based upon the subscriber profile.

13. The method of claim 12 further comprising filtering irrelevant data from the generated web events prior to updating a subscriber profile.

14. The method of claim 13 wherein filtering the web events further comprises removing data with personal or sensitive information (PSI).

15. The method of claim 13 wherein processing the web event further comprises:
    anonymizing the filtered web events to remove potential subscriber identification information;
    storing the anonymized filtered web events;
    applying the behavior pattern recognition analysis to the anonymized filtered web events to generate the one or more profiling algorithm; and
    generating the subscriber profile when the subscriber profile does not exist using the one or more profiling algorithm.

16. The method of claim 12 wherein the one or more profiling algorithms are generated in non-real-time, and each of the one or more profiling algorithms comprise a set of rules that take web events as input and generate profile scores as output, the profile score reflect interests of an entity being profiled, and each profile score can be associated with one of a plurality of categories of interest or descriptors of interest.

17. The method of claim 16 wherein the user profile identifies the entity being profiled identifying a subscriber's household interests defining the aggregate of all web activity associated with a single subscriber ID or personality interests within the subscriber household defining one or more subsets of web activities associated with a single subscriber ID but attributed to one of a plurality of personalities.

18. The method of claim 12 wherein the subscriber network application data is hypertext transfer protocol (HTTP)-based traffic and the web event is an HTTP header.

19. The method of claim 18 wherein receiving and processing the network application data further comprises removing the content portion of HTTP web traffic.

20. The method of claim 19 wherein the web events are selected from the group comprising: search events, website visit events, advertisement (ad) click events, e-Commerce interaction events, and online video selection events.

21. The method of claim 12 where providing web content to a web server further comprises:
    receiving a request for target content from the web server;
    querying a subscriber profile based upon an Internet Protocol (IP) addresses associated with a subscriber associated with the request;
    retrieving a profile associated with the subscriber IP address;
    selecting content from a plurality of content based upon a content score identified in the profile; and
    forwarding the selected content to the web server for display to the subscriber.

22. The method of claim 12 wherein updating the user profile further comprises:
    processing received web events to determine changes in user preferences;
    updating the user profile; and
    storing the user profile.

\* \* \* \* \*